June 2, 1959 R. B. COLT 2,888,896
SHIP'S SINUOUS COURSE GENERATOR
Filed July 19, 1954 6 Sheets-Sheet 1

INVENTOR.
RUTGER B COLT
BY
ATTORNEY

June 2, 1959   R. B. COLT   2,888,896
SHIP'S SINUOUS COURSE GENERATOR
Filed July 19, 1954   6 Sheets-Sheet 2

INVENTOR.
RUTGER B. COLT
BY
ATTORNEY

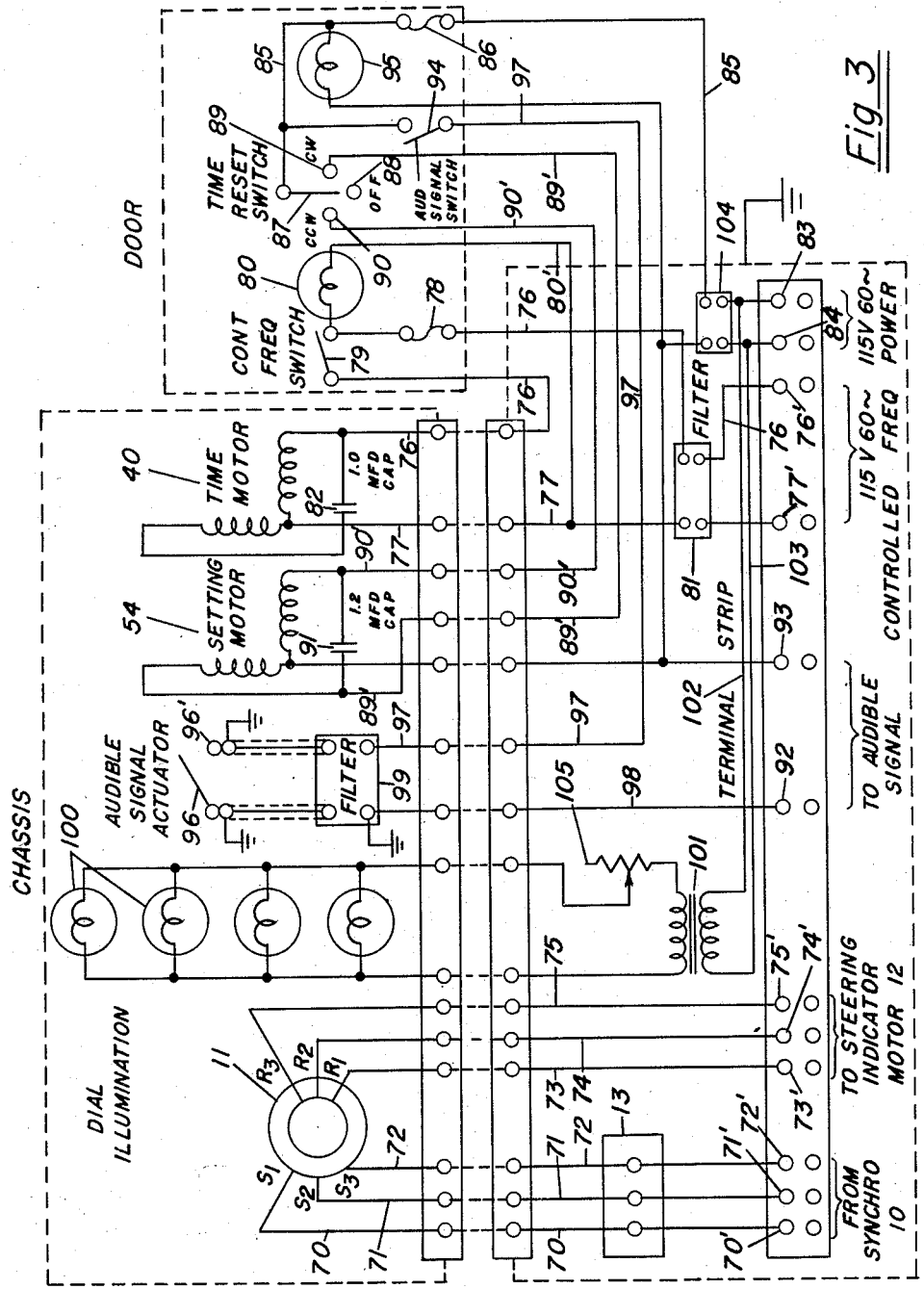

June 2, 1959  R. B. COLT  2,888,896
SHIP'S SINUOUS COURSE GENERATOR
Filed July 19, 1954  6 Sheets-Sheet 4

INVENTOR.
RUTGER B. COLT
BY
ATTORNEY

INVENTOR.
RUTGER B. COLT
BY
ATTORNEY

June 2, 1959 R. B. COLT 2,888,896
SHIP'S SINUOUS COURSE GENERATOR
Filed July 19, 1954 6 Sheets-Sheet 6

INVENTOR.
RUTGER B. COLT
BY
ATTORNEY

United States Patent Office 2,888,896
Patented June 2, 1959

2,888,896

SHIP'S SINUOUS COURSE GENERATOR

Rutger B. Colt, Baltimore, Md., assignor to Bendix Aviation Corporation, Baltimore, Md., a corporation of Delaware Application July 19, 1954, Serial No. 444,214

8 Claims. (Cl. 114—.5)

This invention relates to apparatus for automatically modifying the direction of travel of a ship or like craft while the ship is being steered, either automatically or manually, along a predetermined over-all charted or base course as set, for example, by a gyro compass steering system, such apparatus being aptly termed a sinuous course generator.

An object of the invention is to provide a compact sinuous-course-generating mechanism incorporating a synchro differential which may be electrically connected between a gyro compass direction-signal-transmitting synchro generator and a steering-course-indicating synchro motor.

Another object is to improve the flexibility of sinuous course systems by providing a compact, portable and fully housed differential synchro and associated sinuous cam mechanism which may be connected into the ships compass self-synchronous or synchro system at a convenient location and which at the same time may be readily serviced, not only for repairs but for course-cam resetting and substitution operations.

Another and more specific object is to provide sinuous course generating apparatus having cam rotating means and a quick cam resetting means acting through a common drive system.

A further object is to provide means in apparatus of the type specified which will facilitate the substitution of different sinuous course cams.

The word "synchro" as used herein, is a term commonly applied to the conventional self-synchronous differential transmitter or repeater employed in self-synchronous systems.

The foregoing and other objects and advantages will become apparent in view of the following description taken in conjunction with the drawings, wherein:

Fig. 3 is a wiring diagram;

Figure 1:
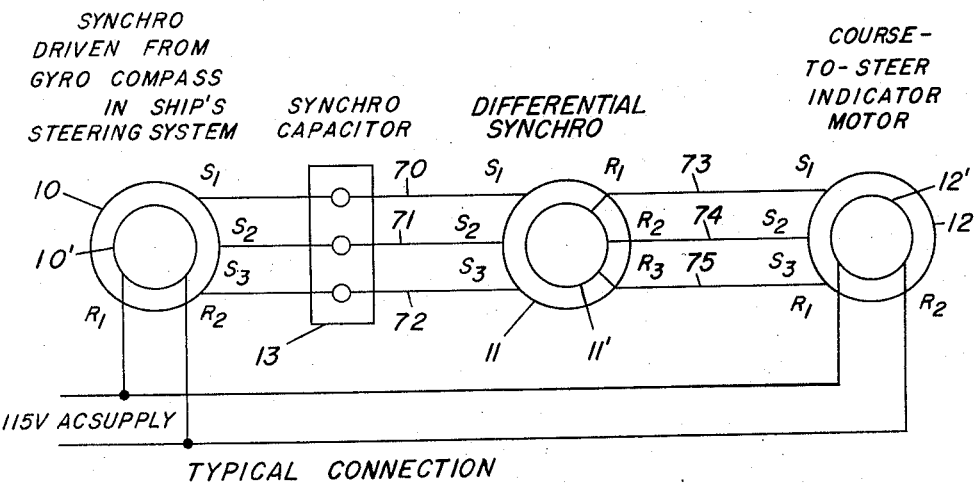
Fig. 1 is a diagram illustrating a differential synchro forming part of a sinuous course generator in accordance with the invention, electrically connected between a gyro compass steering system and a course-to-steer indicator motor.

Fig. 1 illustrates how the sinuous course generator may be operatively connected into a ship steering system. A synchro transmitter 10 has its rotor 10' operatively connected to the gyro compass of the ship (not shown) so as to be rotated or displaced angularly as a function of the course being steered. The sinuous course generator includes a differential synchro 11, electrically connected to transmitter 10 and indicator synchro motor 12 in a manner such that the angular position of the rotor 12' becomes a function of the angular position of the rotor 10' of the synchro 10, subject to a deviation factor produced by the course cams of the sinuous course generator.

The synchro capacitor 13 may be of the usual type and is inserted in the circuit to correct the lagging power factor of the coils and reduce the drain on the supply.

Figure 2:
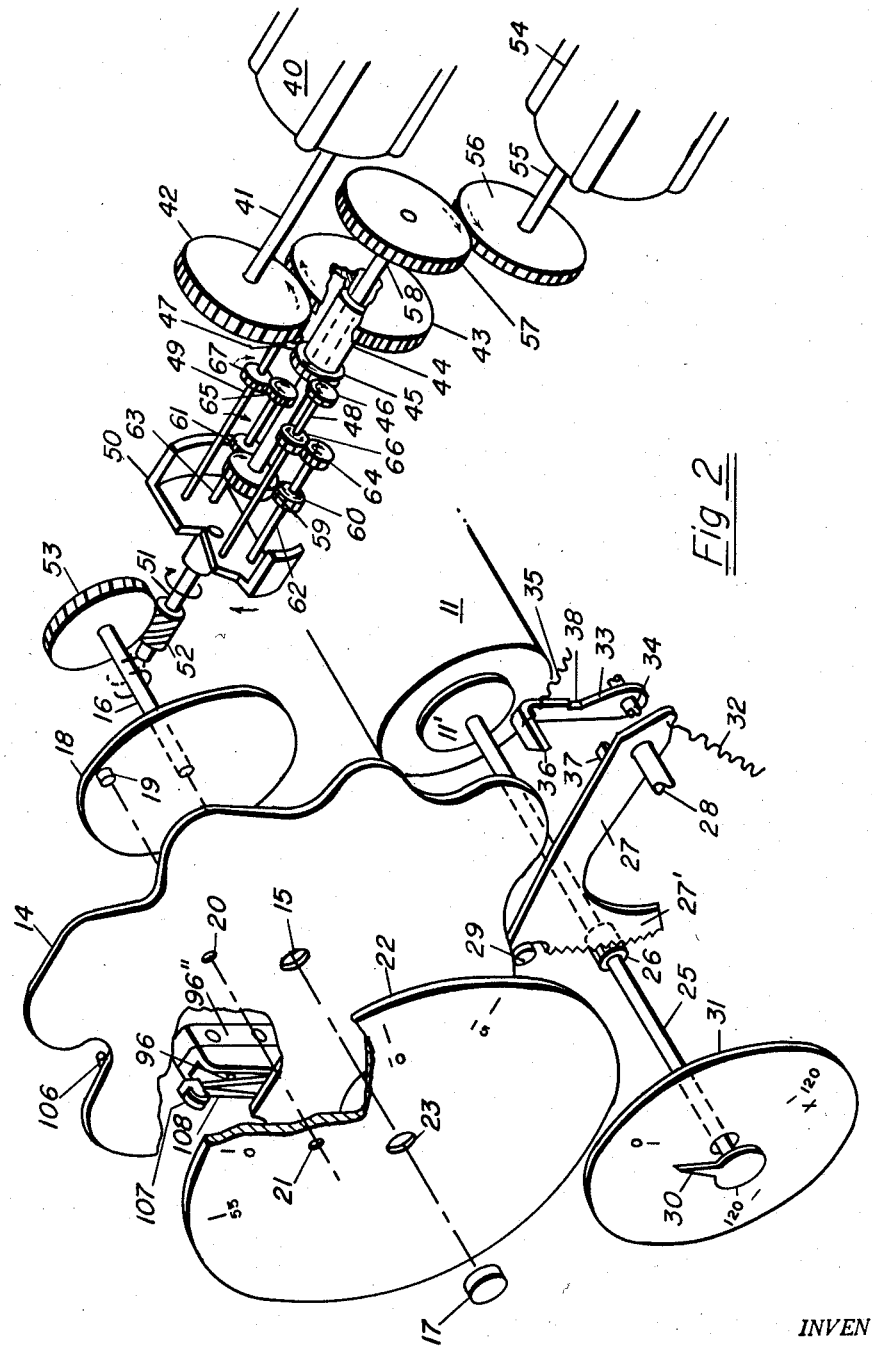
Fig. 2 is a schematic view of the sinuous course generator and associated cam control mechanism.
Figure 5:
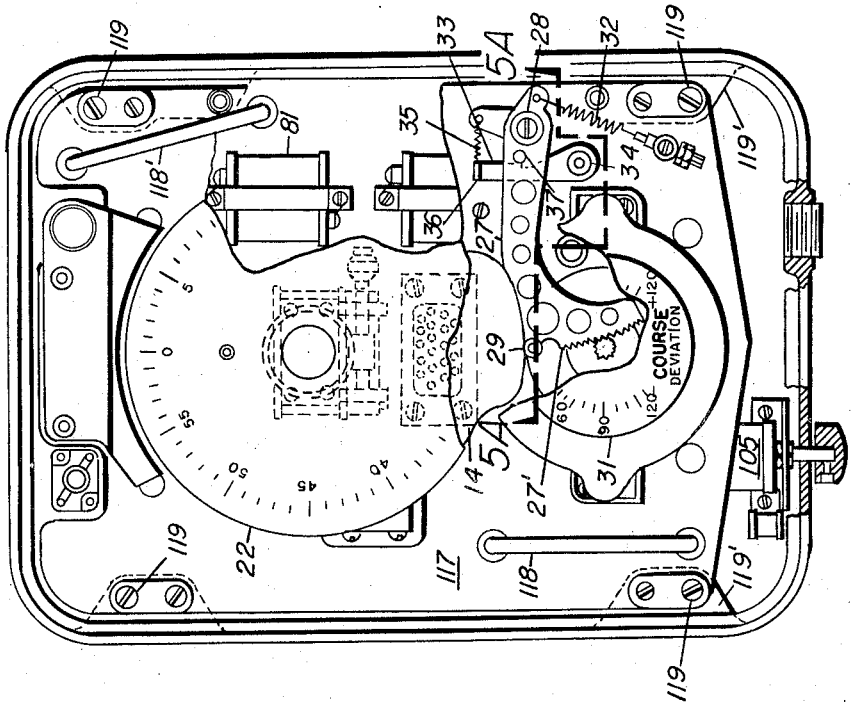
Fig. 5 is a view similar to Fig. 4 but with the door removed and part of the chassis broken away.
Figure 4:
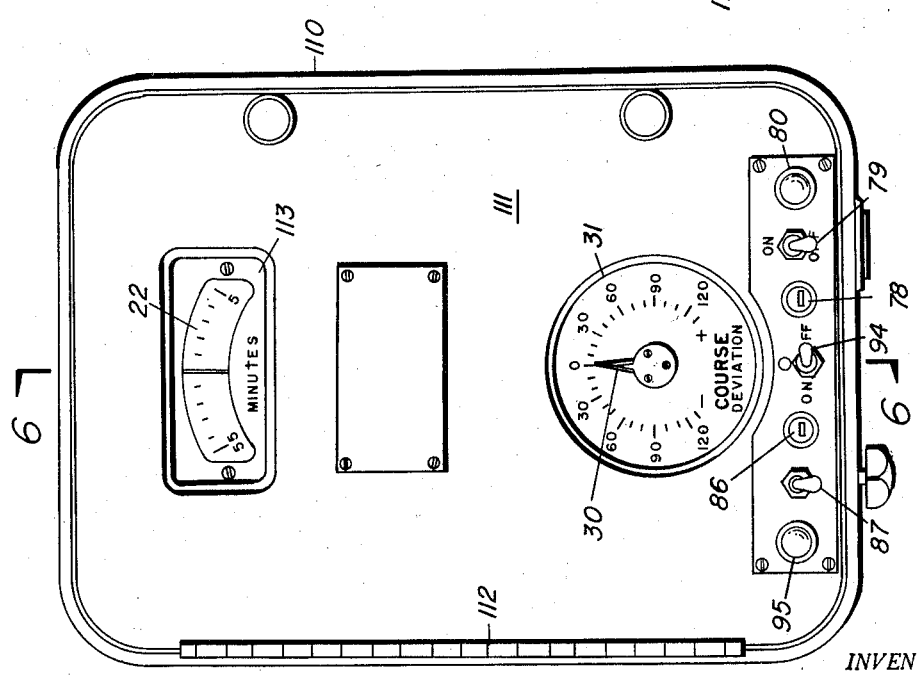
Fig. 4 is a face or front elevation of the sinuous course generator as it appears when assembled in its case or housing.

Referring now to Fig. 2, a sinuous course cam is illustrated at 14; it may be of any selected contour, depending upon the deviation path to be followed. A central hole or opening 15 is formed in the cam, by means of which it is received on a shaft 16, provided with an end retaining nut 17. Also received on the shaft 16 is an indexing base plate 18, carrying an index or pilot pin 19, adapted to register with a hole 20 in the cam 14 and another hole 21 formed in a time dial 22, the latter being centrally bored at 23, to accommodate the shaft 16. It will thus be seen that the shaft 16 carries an assembly, which in the order named comprises the index or base plate 18, the sinuous course cam 14 and the time dial 22, the cam and dial being locked in position by the nut 17.

The rotor 11' of the differential synchro 11 has projected from one end thereof a shaft 25, on which is secured a pinion 26. A lever 27 has formed on the free end thereof a gear segment 27', said lever being rotatably mounted on a shaft 28. Also on the free end of lever 27 is a cam follower 29, adapted to contact the effective surface of the cam 14. The one end of the shaft 25 is provided with a pointer or indicator 30, which coacts with a course-deviation dial 31. A spring 32 is connected to the rear end of the lever 27 and normally urges the said lever and its segmental gear 27' in a clockwise direction, or in a direction to maintain the cam follower 29 against the surface of the cam 14.

In order to facilitate replacement of different course cams, the cam follower 29 and lever 27 may be moved clear of the cam 14 and held in such position by means of a latch lever 33, which is secured on a shaft 34 and is normally urged towards latched position by a spring 35. The free end of the lever 33 is provided with a cam surface 36, by means of which it is automatically released through closing of the door of the generator housing in a manner to be explained. The lever 27 carries a boss or projection 37, adapted to engage in a notch 38, formed in the latch 33, the said latch holding the lever in its inoperative position until released manually, or automatically by contact with the door as above noted.

As will be obvious, rotation of the cam 14 produces rotation of the rotor 11', the degree of rotation being governed by the effective contour of the cam 14. This cam is rotated at some predetermined rate, for example, one revolution per hour. In the present instance, the cam is power driven by means of an electrical time motor 40, the drive being transmitted through a particular type of gear reduction and differential mechanism. Accordingly, the armature shaft 41 of motor 40 has secured thereon a gear 42, in constant mesh with a differential drive gear 43, the latter being secured on, or formed as part of, a hollow shaft 44, provided with a differential gear 45, which is in constant mesh with differential or gear 45 planetary pinions 46 and 47, secured on the adjacent ends of shafts 48 and 49, the latter at their opposite ends being rigidly connected to a rotatable differential housing 50. It will be seen that when gear 59 is held stationary, rotation of the gear 45 in a clockwise direction imparts bodily rotation to the housing 50; and connected to the latter is a shaft 51, on which is secured a worm 52, in mesh with a worm gear 53, secured on the adjacent end of the shaft 16.

In order to facilitate rapid resetting of the sinuous course cam to any desired angular position should it become necessary, a motor 54 is provided and has an armature shaft 55, on which is secured a gear 56, in mesh with a drive gear 57, secured on the adjacent end of a shaft 58, the latter projecting through the hollow drive shaft or sleeve 44 and having secured on its opposite end the gear 59, which is in constant mesh with differential or planetary pinions 60 and 61, secured on shafts 62 and 63, connected to the rotatable housing 50 in the same manner as the shaft 48 and 49. Additional differential pinions 64, 65 are secured on the free ends of the shafts 62, 63 and are in constant mesh with coacting differential pinions 66, 67, secured on the shafts 48 and 49. While in the schematic the pinions of the respective pairs 60 and 64, 66 and 46, 61 and 65, and 67 and 47, are shown separate, in actual practice each pair is substituted by a single elongated pinion, note Fig. 7.

It will be seen that when the motor 54 is energized to rotate the drive gear 56, the shaft 58 is rotated to in turn rotate the gear 59, which acts through the various planetary pinions to rotate the differential housing 50 and hence the shaft 51, worm 52 and shaft 16. As will be hereinafter explained in connection with the wiring diagram of Fig. 3, the motor 54 can be driven in either direction; it is ordinarily capable of imparting a complete rotation to the sinuous course cam 14 in one minute. On the other hand, the motor 40 drives the sinuous course cam very slowly, for example one revolution per hour. Since the cam drive time motor 40 and resetting motor 54 act through a common differential and reduction unit, a more generally over-all compact arrangement of the generator mechanism is rendered possible while at the same time the cam may be reset quickly, in either direction, irrespective of whether or not the motor 40 is in operation.

The wiring diagram in Fig. 3 illustrates how the sinuous course generator system of the present invention may be connected into a ship's wiring system.

The differential synchro 11 has its stator coils connected to the gyro compass synchro of Fig. 1 by way of line wires indicated at 70, 77 and 72, leading from terminals 70', 71' and 72', while its rotor coils are connected to the field coils of the course-to-steer indicator motor 12 by way of line wires indicated at 73, 74 and 75 which lead to terminals 73', 74' and 75'.

The timing motor 40 is shown as of the permanent split capacitor type having its field coils connected to a pair of 115 volt, 60 cycle controlled frequency supply terminals 76' and 77' by way of line wires indicated at 76 and 77. The line 76 has interposed therein a protective fuse 78 and a manual switch 79. Also installed in parallel with the switch 79 is a pilot light 80 having a return lead 80' connected to the line 77. The device indicated at 81 is a noise suppressor which may take the form of the conventional radio frequency filter network. The capacitor indicated at 82 is for shifting the voltage phase angle of one of the motor field coils to 90° with respect to its companion coil.

Terminals 83 and 84 are adapted for connection to a 115 volt, 60 cycle power supply. From terminal 83, circuit wire 85 leads through protective fuse 86 to a time reset switch 87, adapted to be moved into neutral or "off" position at 88, and into selective engagement with contact 89 or contact 90. When switch 87 is moved into engagement with contact 89, a circuit is completed by way of wire 89' in one direction through the field coils of resetting motor 54, and when said switch is moved into engagement with contact 90, a circuit is completed by way of wire 90' in the opposite direction through the field coils of said motor. The capacitor indicated at 91 is the usual phase shift capacitor. As will be understood, the direction of rotation and torque of a split-capacitor motor having two identical windings are determined by the voltages applied to the two windings and the phase relationship between the two applied voltages.

The terminals indicated at 92 and 93 are adapted to be connected to an audible signal or signals, not shown, but which may be installed at any suitable location. An audible signal control or power switch 94 is provided in parallel with a power pilot light 95, and when this switch is closed, a circuit is completed to terminal contact 96' of an audible signal switch 96 by way of wire 97, said switch being of the normally open type and when closed in a manner to be described, completing a circuit to a remote audible or visual signal by way of wire 98. A suitable noise suppressor filter network is indicated at 99.

A series of dial or panel illuminating lights 100 are supplied with current from the secondary of a step-down transformer 101, the primary of said transformer being supplied with current by way of line wires 102 and 103. The item indicated at 104 is another noise suppressor or filter network interposed in the 115 volt, 60 cycle supply. A rheostat 105 is provided in the light circuit for varying the illumination of the lights 100.

In connection with the signal circuit above described, when the ship is being steered by a helmsman in accordance with information signaled to a suitable visual compass indicator, it is important that the helmsman follow the indicated course ase closely as possible in order to reduce the manual error to a minimum. To warn the helmsman of a change in the repeater compass card direction, and in order that he may be prepared to check the swing of the ship in preparation for a reversal of the helm, the course cam 14 is provided with a series of contact pins, one of which is visible at 106 in Fig. 2, so located or spaced that as the cam rotates, the said pins successively engage a roller 107 mounted on the end of a switch arm 108, which is spring-biased to return position, said arm engaging switch 96 and closing the circuit to the audible signal, thereby warning the helmsman that a change in course is imminent. The part indicated at 96'' in Fig. 2 is the housing for switch 96. When audible signals are not desired, switch 94 may be placed in the "off" position.

Figure 5A:
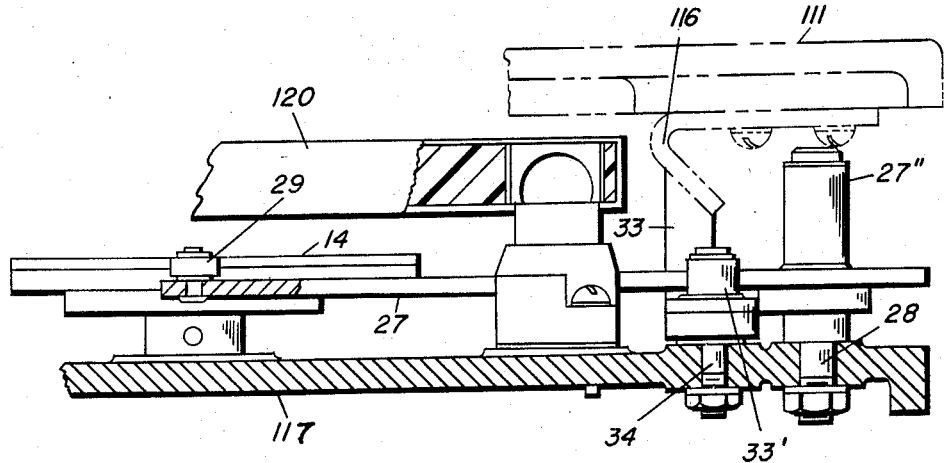
Fig. 5A is a section taken on the line 5A—5A, Fig. 5.

Figs. 4, 5, 6 and 7 show the various parts of the sinuous course generator assembled on a chassis and housed in an appropriate case. The essential parts of the generator have heretofore been described in connection with the schematics of Fig. 1 and Fig. 2 and the electrical diagram of Fig. 3, and these parts have been given similar reference numerals in Figs. 4 to 7, inclusive. The entire unit is housed in a casing 110, provided with a door 111, hinged at one side of the case as indicated at 112. At the bottom of the door are a group of control switches, pilot lights and fuse plugs which in the main have heretofore been identified, and these are wired to suitable terminal blocks or panels as shown in Fig. 3. At the top of the door is a window 113, overlying a sheet metal dial shield 113', back of which is a transparent block 114, having therein the conventional index line which indicates the elapsed time as read on the time dial 22. Adjacent said block is a transparent light distributor 115, in which one of the lights 100 of Fig. 3 is mounted. As best shown in Fig. 5A, the lower inner side of the door has secured thereto a trip member 116 which, when the door is closed, engages the cam surface 36 of the latch 33 heretofore described and insures release of the lever 27 so that it will automatically move the cam follower 29 in engagement with the effective surface of the course cam 14. When the door is swung open, it exposes the chassis which carries the working parts of the sinuous course generator, said chassis comprising a panel 117 provided with handles 118 and 118', to facilitate removal of the chassis from the case 110.

The case has four anchor brackets 119' located adjacent the corners thereof, and the chassis is removably fixed to said brackets by means of anchor screws 119.

Figure 6:
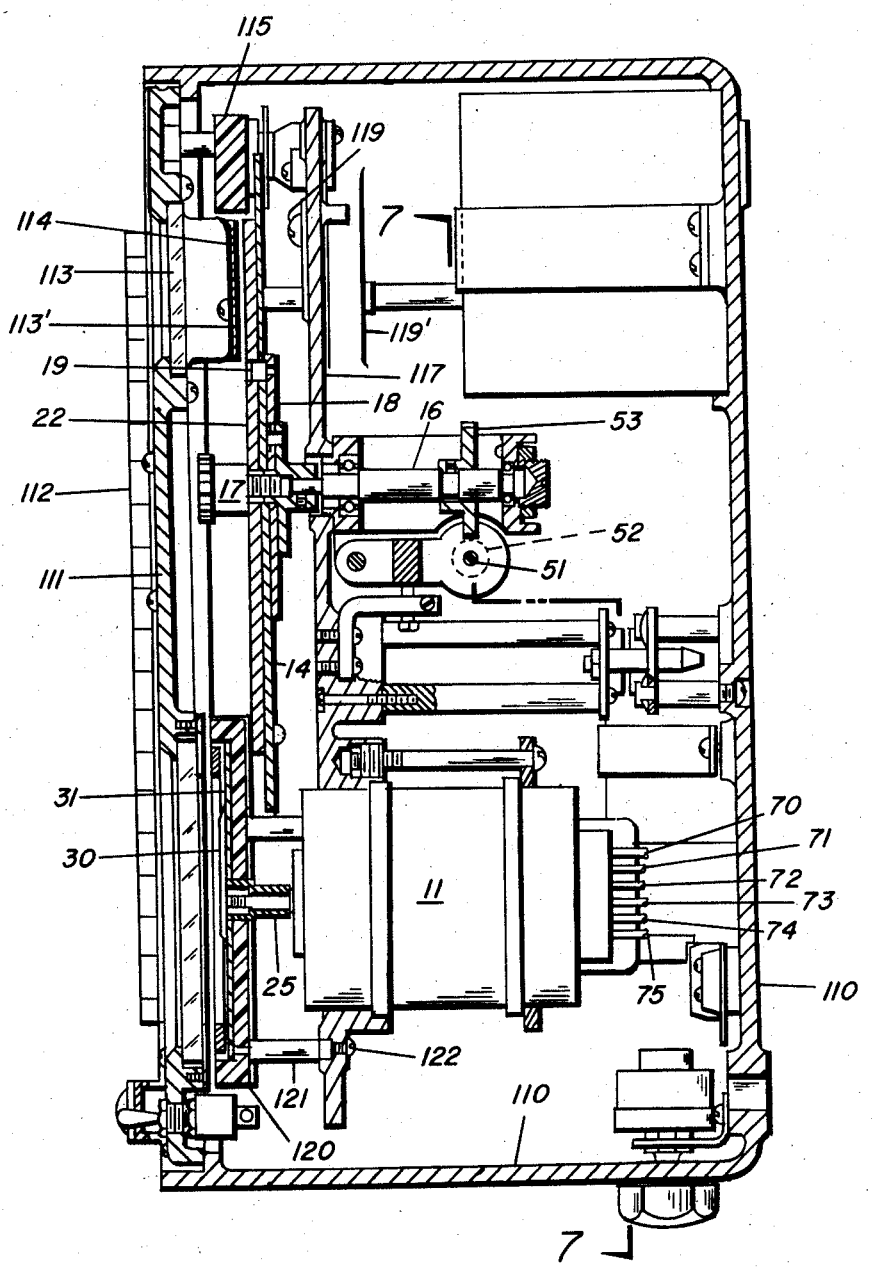
Fig. 6 is a section taken on the line 6—6 of Fig. 4.
Figure 7:
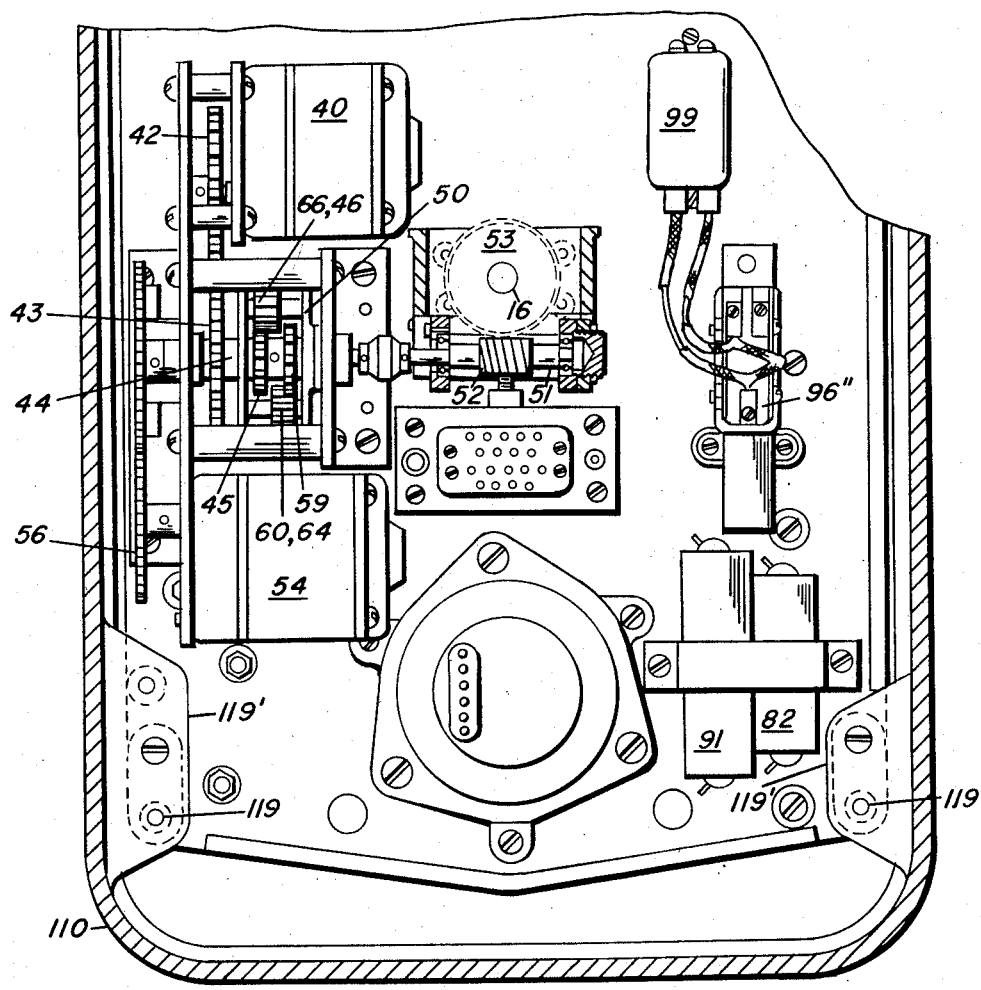
Fig. 7 is another section taken on the line 7—7 of Fig. 6.

In back of the chassis panel 117 are mounted the synchro 11 and motors 40 and 54, with the differential housing arranged therebetween, note Fig. 7. In actual construction, the segmental gear lever 27 is provided with a hub 27" which is journaled on shaft 28, and in a like manner latch lever 33 is provided with a hub 33', which is journaled on shaft 34, revert to Fig. 5A. The part indicated at 120 in Figs. 5A and 6 is a light distributor for the compass deviation dial 31; it is provided with mounting posts 121 which are anchored to the chassis panel 117 by means of screws 122.

Operation

Reference is made to the schematic diagram of Figs. 1 and 2 in describing the general mode of operation of the improved sinuous course generator.

The synchro generator 10 has its rotor 10' driven from the gyro compass of the ship's steering system, and hence said rotor is displaced angularly an amount corresponding to the angle between the ship's course and true North. The rotor 11' of differential synchro 11 is displaced angularly from a neutral or zero point by an amount dictated by the rise or fall of cam follower 29 in response to rotation of the cam 14. Hence the receiver synchro rotor 12' will assume an angle equal to the sum of the above two angles, and this deviation from the base course will be indicated by pointer 30 on dial 31. The rotor 12' is usually connected to the ship's compass card or dial, by which the pilot steers the ship. Ordinarily the appropriate ship's officer gives the desired course to be followed and the helmsman or pilot steers as instructed, using a separate manual steering wheel (or an automatic pilot may be employed) operatively connected to the rudder, the steering wheel being manipulated to keep the compass card or dial driven by synchro rotor 12' aligned with a lubber line. The indicator driven by 12' constantly follows the rotor 11', being displaced in accordance with the displacement of roller 29, which follows the periphery of cam 14. Should the ship deviate from its set course, the compass card or dial would immediately show the off-course deviation, whereupon the helmsman or pilot would take corrective measures. In effect, the sinuous course generator gives the helmsman the impression that he is going off course, whereupon he adjusts the steering wheel to follow the correct course and in doing this the ship is caused to follow the desired sinuous pattern. In case the conventional automatic pilot is employed, the same conditions will govern, since in such case the rotor 12' will serve as the signal input for the automatic pilot.

The cam 14 and dial 22 are rotated together or in unison at a constant speed of, for example one revolution per hour by the motor 40, which drives the shaft 16 through the differential and gear reduction mechanism heretofore described. In case the ship is to be steered manually, the signal switch 94 is closed. Under such conditions, when one of the contact pins 106 on the cam 14 closes switch 96, a suitable signal (not shown) will be energized at say 20 to 40 seconds prior to any change in course, or course deviation, so that the helmsman may be prepared to check the swing of the ship in preparation for a reversal of direction of the helm. When an automatic pilot is used, the switch 94 is placed in open position.

Should it become necessary to reset the cam 14 and dial 22 to zero, or any other selected setting, the switch 87 is moved into engagement with either contact 89 or 90, depending upon the direction of rotation to be imparted to the cam and dial, whereupon the resetting motor 54 will be energized to thereby drive the shaft 16 through the differential mechanism heretofore described. Since the resetting motor 54 is capable of driving the cam 14 and dial 22 considerably faster than can the motor 40, the resetting operation can be performed rapidly either while the motor 40 is in operation or with the latter idle, and this may be done without changing gears or utilizing any other more or less complicated controls. In practice, the resetting motor 54 drives the sinuous course cam and its associated dial at one revolution per minute.

When it is desired to change the course cam 14, the lever 27 may be conveniently disengaged and held in disengaged position by the latch 33; and should release of the said latch be overlooked after the resetting operation, it will be automatically tripped by the member 116 when the door 111 is closed.

It will be understood that no attempt has been made herein to describe all the advantageous functions of which the apparatus is capable, and further that limited changes in construction and design may be adopted within the scope of the invention as defined by the appended claims.

What is claimed and desired to be secured by United States Letters Patent is:

1. A sinuous course generator including: a stator, a rotor, a sinuous course cam operatively connected to said rotor, a time motor for driving said cam, and power means for rotating said cam to a resetting position at a speed much greater than that imparted to said cam by said time motor.

2. A sinuous course generator including: a stator, a rotor, a sinuous course cam operatively connected to said rotor, a time motor for driving said cam, another motor for rotating said cam to a resetting position, said driving motor and resetting motor being operatively connected to said cam through common differential and gear reduction mechanism.

3. A sinuous course generator including: a stator, a rotor, a sinuous course cam, a timing dial rotatable with said cam, a shaft on which said cam and dial are mounted, means providing a drive connection between said cam and said rotor, a course deviation dial, an indicator or pointer associated with said latter dial and operatively connected to said rotor, a time motor for driving said cam, another motor for resetting said cam, and coacting differential and gear-reduction mechanism driveably connecting said motors to said cam.

4. A sinuous course generator including: a stator, a rotor, a sinuous course cam, a timing dial rotatable with said cam, a shaft on which said cam and dial are mounted, means providing a drive connection between said cam and said rotor, a course deviation dial, an indicator or pointer associated with said latter dial and operatively connected to said rotor, a time motor for driving said cam, another motor for resetting said cam, and common differential and gear-reduction mechanism operatively connecting said motors to said shaft.

5. A sinuous course generator including: a stator, a rotor, a sinuous course cam, means driveably connecting said cam to said rotor, a shaft on which said cam is mounted, a timing dial also mounted on said shaft, a course deviation dial, a pointer associated with said latter dial and rotatable with said rotor, a time motor for driving said cam at a slow rate of rotation and another motor for driving said cam to a selected resetting position at a much greater rate of rotation, and means driveably connecting said motors to said shaft.

6. A sinuous course generator including: a stator, a rotor, a sinuous course cam, means driveably connecting said cam to said rotor, a shaft on which said cam is mounted, a time motor for driving said shaft and cam to produce a sinuous course, said means for driveably connecting said cam to said rotor including a gear member actuated by said cam, said gear member being movable to a drive-disconnected position to facilitate changing cams, and means for latching said gear member in said position.

7. A sinuous course generator including: a stator, a rotor, a sinuous course cam, means driveably connecting said cam to said rotor, a shaft on which said cam is mounted, a time motor for driving said shaft and cam to produce a sinuous course, said means for driveably connecting said cam to said rotor including a gear member actuated by said cam and adapted to be moved to a drive-disconnected position to facilitate changing cams, means for latching said gear in such position, said generator being mounted in a case provided with a door, and means on said door arranged to automatically trip said latching means when said door is closed.

8. Apparatus as claimed in claim 7 wherein said rotor is mounted on a shaft and said gear member is in the form of a segmental gear in mesh with a pinion secured on said rotor shaft and carried by a pivoted lever, and said latching means is arranged to engage said lever.

References Cited in the file of this patent

UNITED STATES PATENTS

| | | |
|---|---|---|
| 1,497,059 | Bates | June 10, 1924 |
| 2,340,175 | Chance | Jan. 25, 1944 |
| 2,360,361 | Mountbatten | Oct. 17, 1944 |
| 2,519,058 | Lundberg et al. | Aug. 15, 1950 |
| 2,581,436 | McCarthy | Jan. 8, 1952 |
| 2,596,130 | Cunningham | May 13, 1952 |
| 2,634,067 | McCoy et al. | Apr. 7, 1953 |
| 2,753,498 | Gray | July 3, 1956 |